(12) United States Patent
Bober et al.

(10) Patent No.: US 7,751,591 B2
(45) Date of Patent: Jul. 6, 2010

(54) DOMINANT MOTION ANALYSIS

(75) Inventors: Miroslaw Bober, Guildford (GB); Alexander Sibiryakov, Guildford (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 864 days.

(21) Appl. No.: 11/280,398

(22) Filed: Nov. 17, 2005

(65) Prior Publication Data

US 2006/0159311 A1 Jul. 20, 2006

(30) Foreign Application Priority Data

Nov. 18, 2004 (GB) ................... 0425430.6

(51) Int. Cl.
G06K 9/00 (2006.01)
H04N 5/228 (2006.01)
(52) U.S. Cl. .............. 382/107; 382/275; 348/208.13
(58) Field of Classification Search .............. 382/100, 382/103, 106, 107, 162, 168, 181, 192, 199, 382/209, 232, 254, 274, 276, 278, 280, 294, 382/295, 305, 275; 375/240.16; 348/208.13
See application file for complete search history.

(56) References Cited

U.S. PATENT DOCUMENTS 5,973,733 A * 10/1999 Gove ............... 348/208.13
6,157,677 A * 12/2000 Martens et al. ......... 375/240.16
6,473,462 B1 10/2002 Chevance et al.
6,474,462 B2 11/2002 Wipf et al.
6,925,195 B2 * 8/2005 Cahill et al. .................. 382/107
7,020,351 B1 * 3/2006 Kumar et al. ............... 382/305
7,187,810 B2 * 3/2007 Clune et al. .................. 382/294
7,359,563 B1 * 4/2008 Dua et al. .................... 382/254

OTHER PUBLICATIONS

Lucchese L: "A Frequency Domain Technique Based on Energy Radical Projections for Robust Estimation of Global 2D Affine Transformations" Computer Vision and Image Understanding Academic Press, San Diego, CA, US, vol. 81, No. 1, Jan. 1, 2001, pp. 72-116, XP004434116 ISSN: 1077-3142.*
I Alliney Set al: "Digital Image Registration Using Projections" IEEE Transactions on Pattern Analysis and Machine Intelligence, IEEE Inc. New York, US, vol. PAMI-8, No. 2 Mar. 1986, pp. 222-223, XP009037165 ISSN: 0162-8828.*

(Continued)

Primary Examiner—Seyed Azarian
(74) Attorney, Agent, or Firm—Birch, Stewart, Kolasch, & Birch, LLP.

(57) ABSTRACT

A method of representing a 2-dimensional image comprises deriving at least one 1-dimensional representation of the image by projecting the image onto at least one axis, and applying a Fourier transform to said 1-dimensional representation. The representation can be used for estimation of dominant motion between images.

30 Claims, 10 Drawing Sheets

OTHER PUBLICATIONS

Alliney S et al: "Digital Image Registration Using Projections" IEEE Transactions on Pattern Analysis and Machine Intelligence, IEEE Inc. New York, US, vol. PAMI-8, No. 2, Mar. 1986, pp. 222-223, XP009037165 ISSN: 0162-8828.

Lucchese L et al: "High Resolution Estimation of Planar Based on Fourier Transform and Radial Projections" ISCAS '97. Proceedings of the 1997 IEEE International Symposium on Circuitd and Systems. Circuits and Systems in the Information Age. Hong Kong, Jun. 9-12, 1997, IEEE International Symposium on Circuits and Systems, New-York, NY: IEEE, US, vol. 2, Jun. 9, 1997, pp. 1181-1184, XP000832413 ISBN:0-7803-3584-8.

S. Ertürk: "Digital Image Stabilization with Sub-Image Phase Correlation Based Global Motion Estimation", IEEE Transactions on Consumer Electronics, vol. 49, No. 4, Nov. 2003.

G.A. Thomas, "Television motion measurement for DATV and other applications", BBC RD Nov. 1987.

* cited by examiner

DOMINANT MOTION ANALYSIS

BACKGROUND TO THE INVENTION

This invention concerns a method for estimating a dominant motion between frames in sequences of images or video sequences. Practical applications include camera image stabilisation, video coding and standards conversion.

PRIOR ART

Efficient estimation of dominant motion is an important process for many tasks, including video coding, camera image stabilisation, motion-based video segmentation, standards conversion or noise reduction.

There is a substantial volume of background art. There are several broad classes: i) feature detection (edges or corners) combined with some kind of regression, ii) Fourier transform based techniques and iii) template matching techniques.

Phase correlation is a well-known technique that is reasonably fast and can measure significant displacements (C. Kuglin and D. Hines., "*The Phase Correlation Image alignment Method*", IEEE Int. Conf. on Cybernetics and Society, 1975 and G. A Thomas, "*Television motion measurement for DATV and other applications*", BBC RD 1987/11).

Briefly, in order to register two images, the phase correlation method involves first performing a two-dimensional Fourier transform on each image, then multiplying together corresponding frequency components, and applying an inverse Fourier transform on the resulting product to obtain the so-called phase-correlation surface. The translational motion can be recovered by searching for the position of a peak in the 2D phase correlation surface.

For example, the U.S. Pat. No. 6,474,462 discloses a method combining a phase-correlation peak detection algorithm and a multi-resolution robust regression method to increase robustness of the estimation process.

However, the classical phase correlation method may be too complex for real-time implementation, especially when high-resolution video sequences are processed. This is because computation of 2D Fourier transform for high-resolution images poses significant demands on computational and memory resources.

Different approaches were investigated in order to reduce complexity. For example Erturk, ("*Digital image stabilization with sub-image phase correlation based global motion estimation*", IEEE Transactions on Consumer Electronics, pp 1320-1325, Volume: 49, Issue: 4 Nov. 2003) presents a digital image stabilization method that reduces the complexity of the phase-correlation approach by considering only four regions of 64×64 pixels in size located the corner areas of the image. Global motion is estimated from the local motions of four sub-images, each of which is detected using phase correlation based motion estimation. The utilization of sub-images enables fast implementation of phase correlation based motion estimation. The global motion vectors of image frames are accumulated to obtain global displacement vectors, that are Kalman filtered for stabilization. However, as a result of the use of sub-regions with limited spatial support, the robustness of the method to larger motion is significantly reduced.

As explained, all the techniques mentioned above are quite complex and are not sufficiently robust to factors such as rapid motion, illumination-changes, local-objects, etc.

PROBLEMS ADDRESSED BY THE INVENTION

This invention proposes a novel, ultra-fast method for estimation of motion in video sequences or other sequences of images or 2D data. The estimation process is very fast, typically 10 to 500 times faster then prior-art estimation methods using phase correlation approaches, and gives reliable results even in noisy images and for video sequences with significant and rapid motions. The invention also provides a very compact description of frame or frame video data, which is applicable to motion analysis and other video sequence analysis tasks.

DESCRIPTION OF THE INVENTION

According to one aspect, the invention provides a method of representing an image by processing signals corresponding to the image using an apparatus, the method comprising deriving at least two 1-dimensional representations of the image, wherein each 1-dimensional representation is derived by projecting the image onto a respective axis.

According to another aspect, the invention provides a method for representing a sequence of images, for example a video sequence, by combining representations of each constituting image.

According to another aspect, the invention provides a method of comparing images by processing signals corresponding to the images using an apparatus, the method comprising deriving at least two 1-dimensional representation of each 2-dimensional image, and comparing corresponding 1-dimensional representations for the images, wherein each 1-dimensional representation is derived by projecting each image onto a respective axis.

Preferably, the method is for estimating motion between images, and especially for estimating dominant motion between images.

According to yet another aspect, the invention provides a method for deriving a reliable and accurate motion estimate for a sequence of images by robust integration of multiple estimates of the motions between different multiple pairs of frames, which are not necessarily adjacent in time. Such averaging is practicable due to dramatically reduced requirements on processing power and memory use provided by another aspect of the invention.

The invention will now be described with reference to the following figures:

FIG. 3 (*a*) shows X-projections and FIG. 3 (*b*) Y-projections.

The main idea of the proposed algorithm is to convert 2D image information to multiple 1D-signals at an early stage of processing and description extraction. This is accomplished by projecting the image onto at least two axes. In a preferred embodiment focusing on reduction of computational complexity, lateral projections in x and y-directions were selected. If I(x,y) is an image (it can be any colour channel or image hue, saturation or intensity), then X- and Y-projections are computed as follows:

$$XProjection(x) = \sum_y I(x, y),$$

$$YProjection(y) = \sum_x I(x, y)$$

Figure 1:
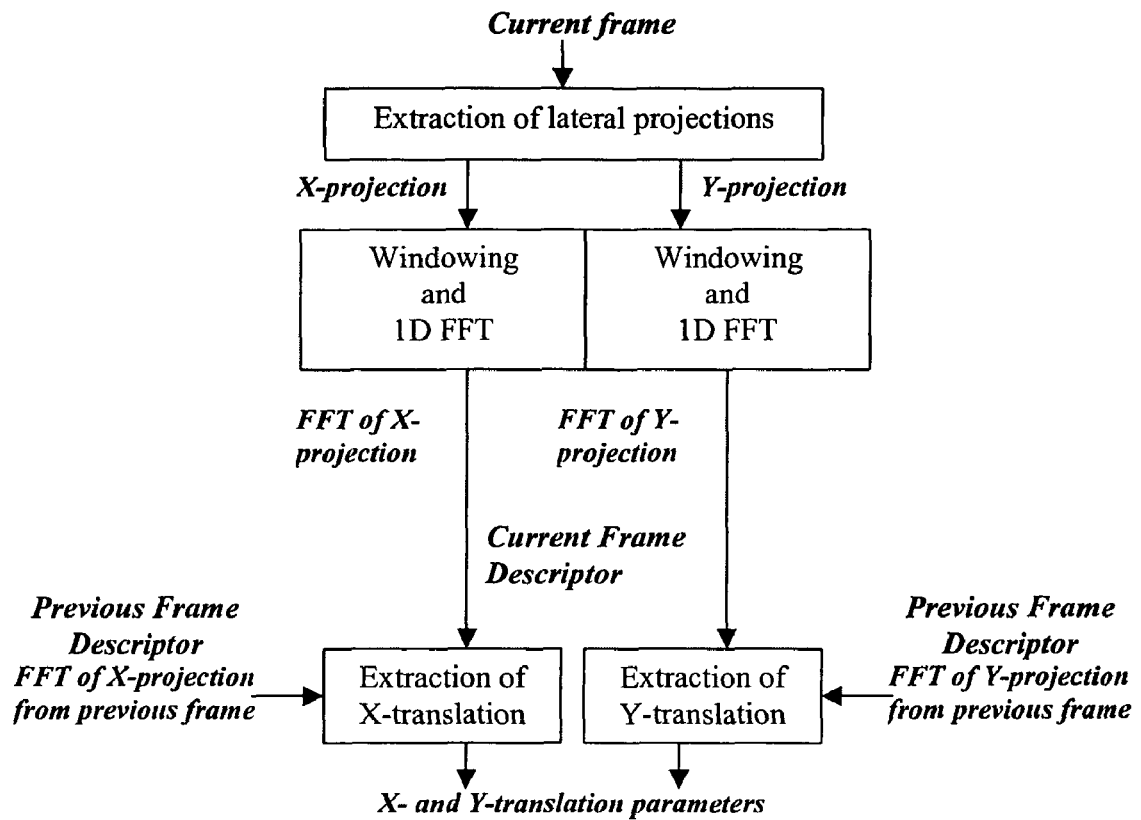
FIG. 1 shows a block diagram of the algorithm
Figure 2:
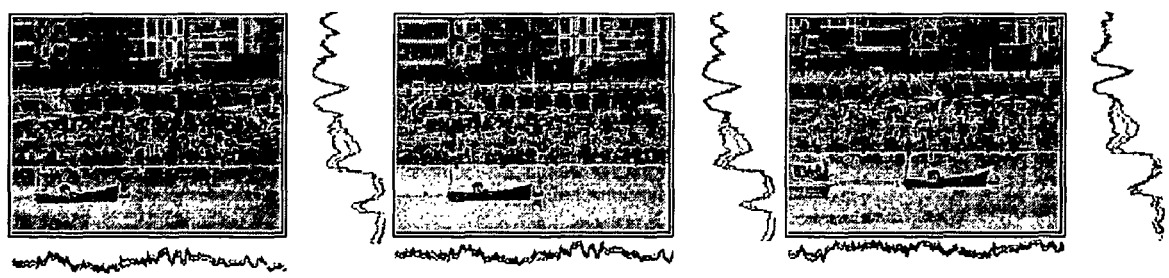
FIG. 2 shows three frames from a video sequence "Donostia" and their lateral projections

Both projections can be computed in a single 2D-scan of the image. FIG. 2 (a,b, and c) shows three frames from a video sequence "Donostia" and their lateral projections for RGB colour channels. X-projection is shown below each frame and Y-projection is shown on the right side of each frame. Projections of all colour channels are shown, while a preferred embodiment of algorithm uses only projections of the green channel.

Figure 3A:
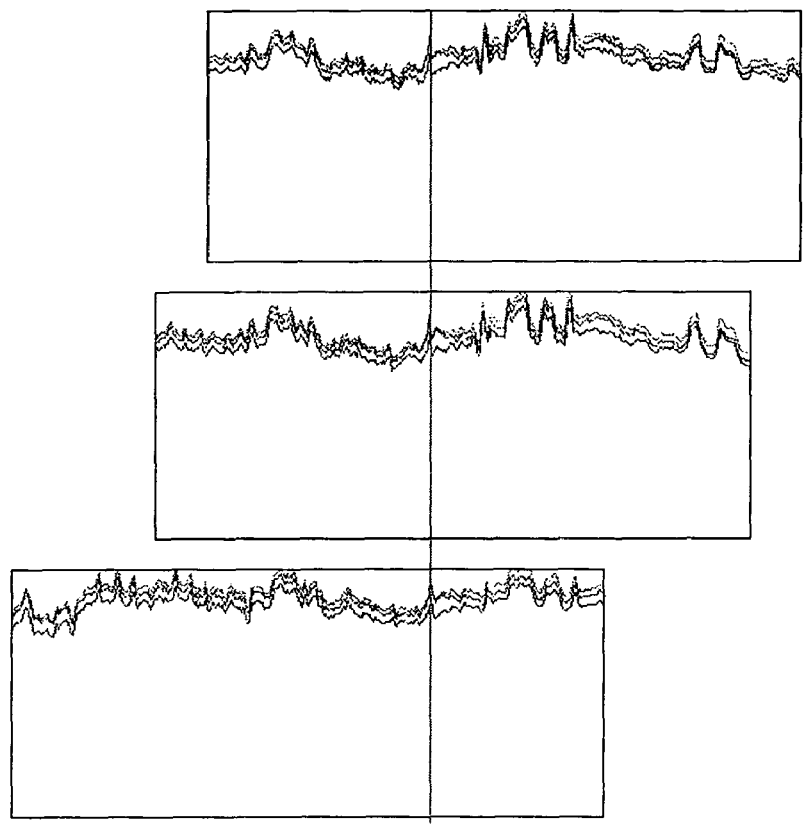
FIG. 3 shows the result of projection alignment for frames shown in FIG. 2.
Figure 3B:
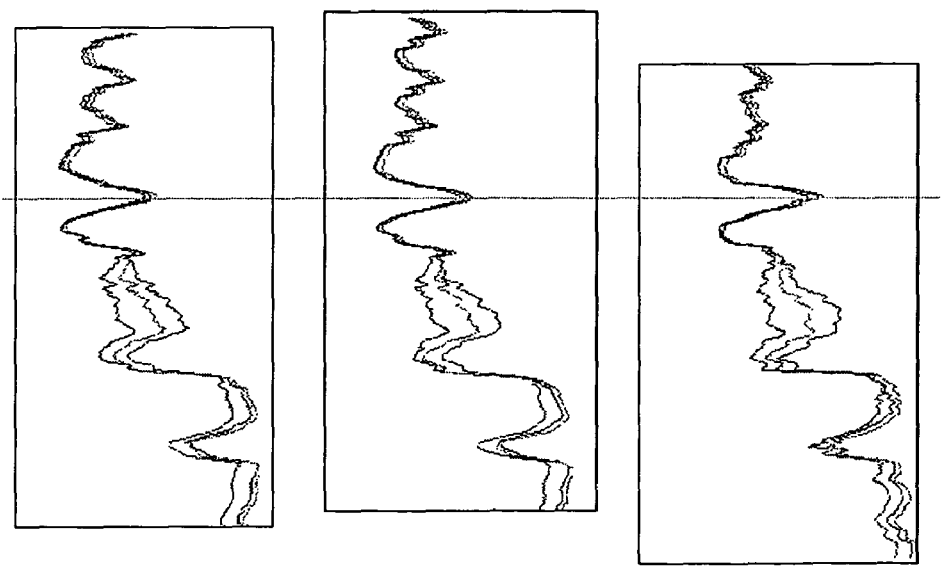

It is known in the prior art to align 2D-images via 2D phase correlation, which provides simultaneous recovery of both translation parameters, i.e. vx and vy. However such processing poses very demanding requirements on the memory and processing resources. According to the invention, only 1D-projections of the image are aligned and the projected 1D displacements are fused to obtain the 2D motion. When two 1-D projections on the X-axis and Y-axis are used, the method obtains X- and Y-translation parameters (vx,vy) directly form each projection respectively. FIG. 3 shows alignment of projections from FIG. 2. The estimated translations between projections are fused to obtain the translation motion between two frames.

Figure 4:
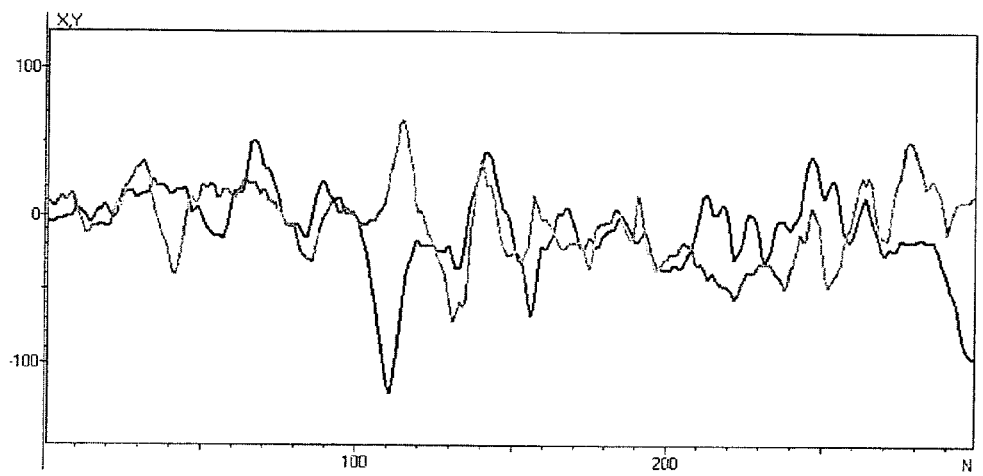
FIG. 4 shows X- and Y displacement between frames as a function of frame index.
Figure 5:
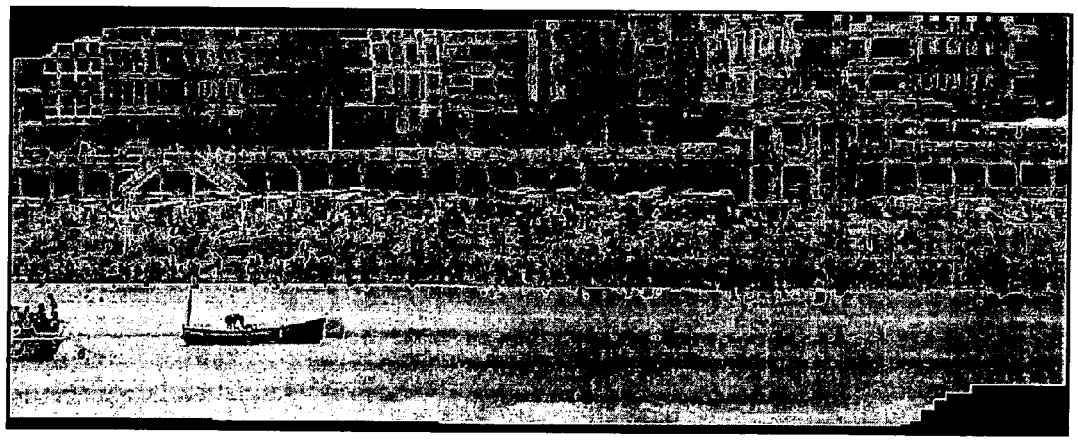
FIG. 5 shows a mosaic created from video frames using translation parameters estimated using the invention.

An example of translation graphs is shown in FIG. 4. By translating the frames into a common coordinate system one can obtain either a video mosaic or a stabilised video sequence (depending on particular application of the algorithm). An example of a video mosaic reconstructed with parameters estimated using the invention is shown in FIG. 5.

Estimation of Component Velocities using 1D Phase Correlation

Once the projections of the current frame are extracted, they are windowed and transformed into the Fourier domain to form a multi-projection image descriptor. Multi-projection image descriptor for the current frame and previous frame is used to estimate motion (displacement) between frames.

Figure 6:
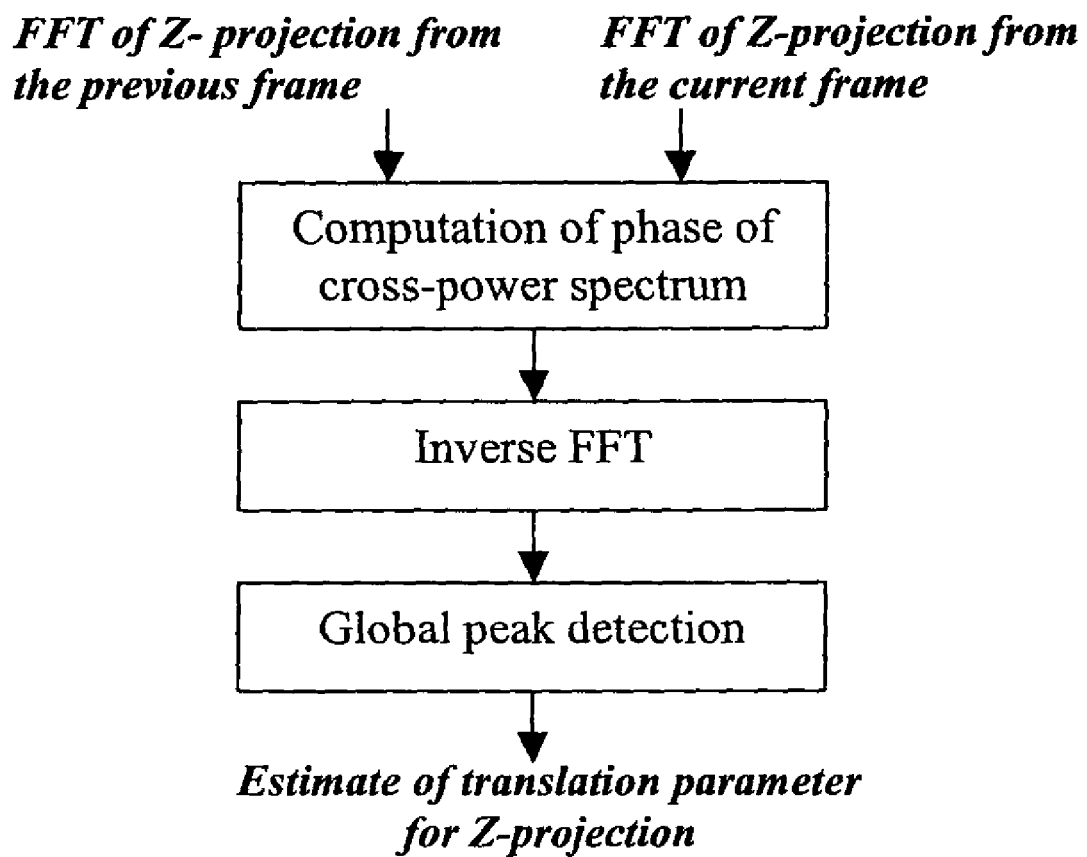
FIG. 6 shows block-diagram of the module estimating a component of the translation motion from 1D image projections.

The phase correlation algorithm (FIG. 6) is used to detect a shift between two 1D-signals (two projections).

Phase Correlation (FIG. 7) is a robust method of translational alignment of two signals. The method is based on the Fourier Transform and the Shift Theorem. If two signals $P_i$ and $P_j$ differ only by translation a:

$$P_i(x)=P_j(x+a),$$

Then applying standard phase correlation $$C_{ij}^* = \frac{F(P_i)F*(P_j)}{|F(P_i)F*(P_j)|},$$

$$C_{ij} = F^{-1}\{C_{ij}^*\}$$

where F(f) is Fourier transform of a signal f F*(f) is a complex conjugation of F(f), we obtain a pulse at the translation values:

$$C_{ij}(x)=\delta(x-a)$$

Figure 7:
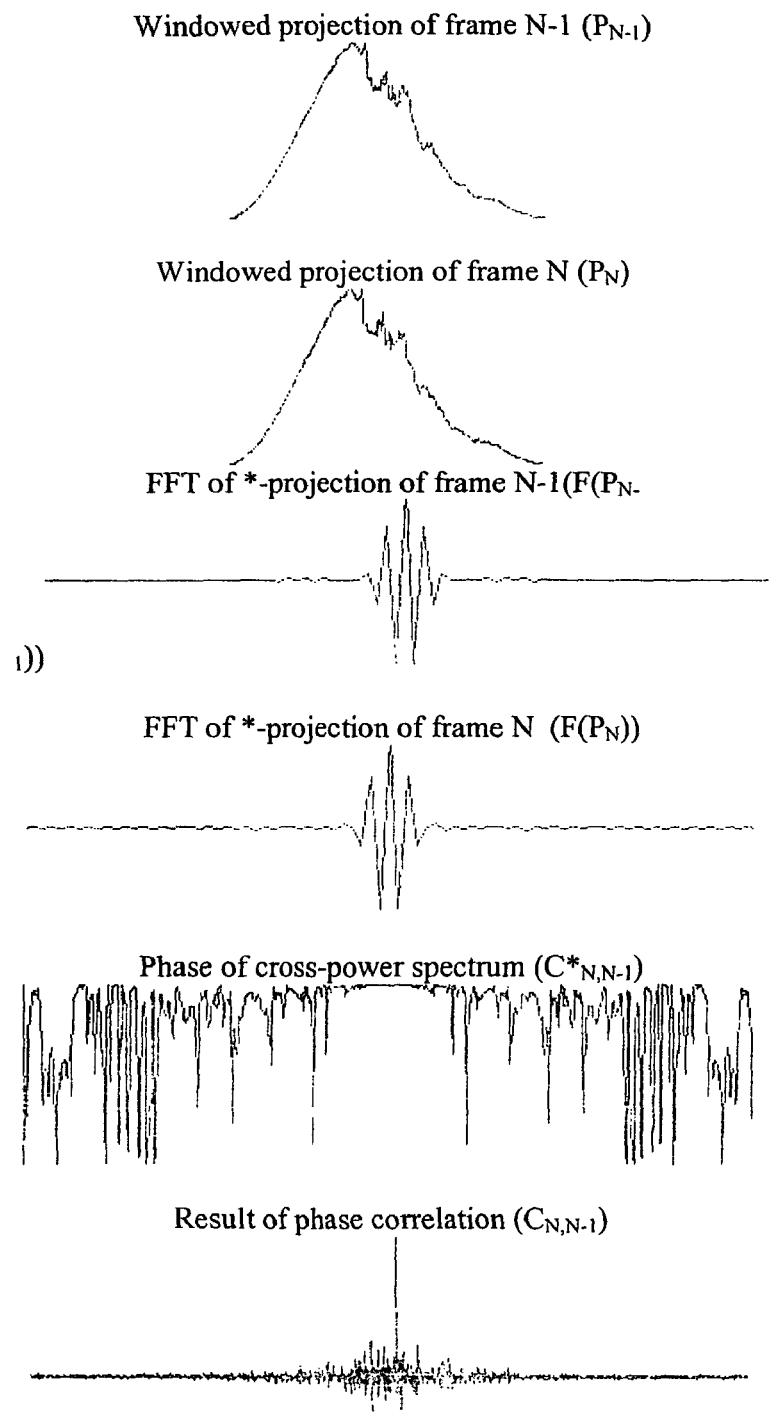
FIG. 7 shows example processing results for phase correlation method of detecting the shift between two 1D signals.

The translation value can be determined by finding the highest peak in the resulting signal (FIG. 7).

It is known that in order to reduce artefacts caused by signal boundaries, a windowing operator should be applied to the signals (i.e. original projections). The following window-function is used:

$$W(x)=0.5(1+\cos(2\pi*(x/M-0.5)),$$

where M is a length of the signal. The windowed projection is obtained as follows:

$$P_j(x)=W(x)P(x)$$

One useful feature of the phase correlation method is that an easily identifiable peak can be found in the correlation function as long as transformation between frame projections can be approximated by translation. When the phase correlation peak becomes lower, this can indicate two situations: (1) the motion cannot be approximated reliably by translation, (2) overlapping between frames is small. In these situations, motion estimates should be rejected in order to avoid gross motion estimation errors. Therefore, the amplitude of the peak is a suitable indicator of a quality of 1D displacement estimate, the higher the peak, the more reliable an estimate is. The peak amplitudes from matching of all projections can be combined into a single estimate confidence factor C, for example by taking the minimum value, or by any other prior art method. This confidence factor C can be compared against a threshold in order to reject an unreliable matching result.

Robust Integration of Motion Information from Multiple Frames

It is often desirable to "align" multiple frames in a video sequence 1, 2, . . . , K, and it is known that the displacement vector of the Kth frame $T_K$ with respect to the coordinate system aligned with the first frame can be determined as a sum of all inter-frame displacements:

$$T_K=T_{1,2}+T_{2,3}+\ldots+T_{K-1,K}$$

Figure 8:
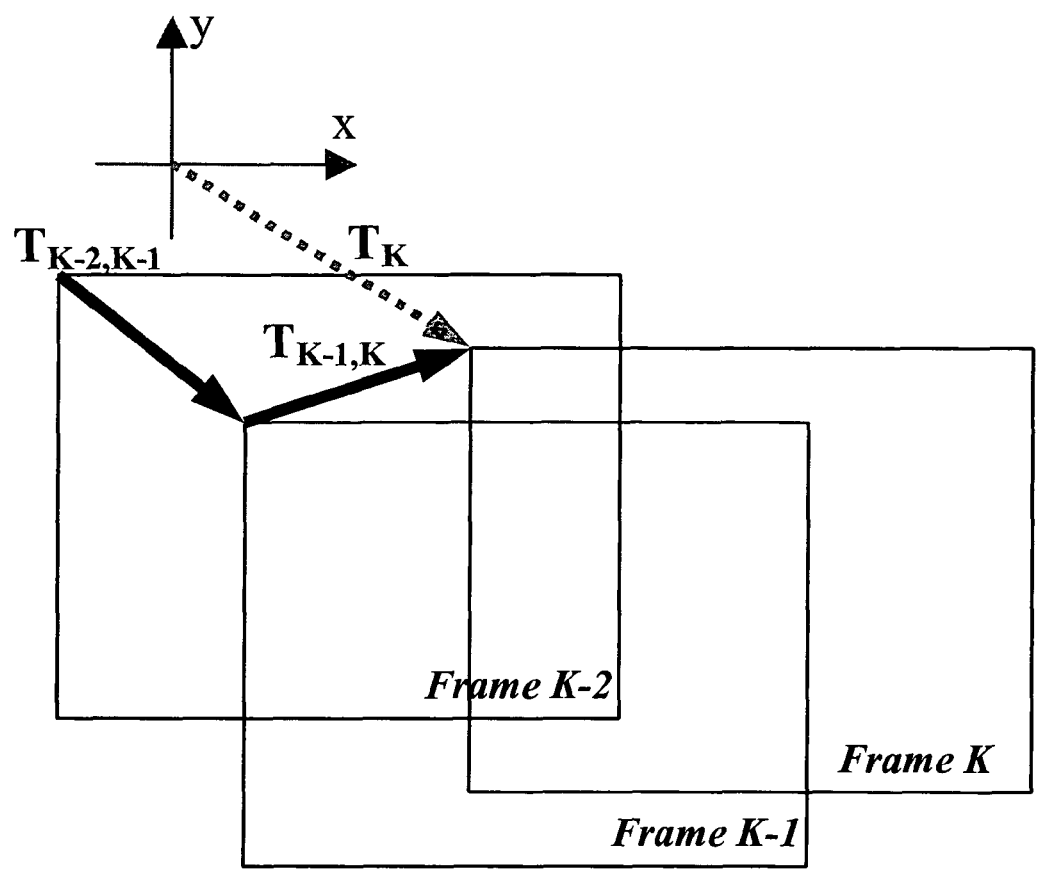
FIG. 8 depicts dominant motion estimation algorithm based on two frames.

An example of this approach with three frames K−2, K−1 and K is shown in FIG. 8. Each translation motion $T_{I-1,I}$ can be estimated using a fast prior-art method or the by applying the present invention. However, in such an approach, errors in the estimated component translations are accumulated which may lead to an unacceptable overall error. Furthermore, a gross error in any of the component translation estimates, say $T_{I-1,I}$ (e.g. due to short-term occlusion or blurring) will lead to errors in all subsequent estimates of the global displacements $T_I, T_{I+1}, \ldots, T_K$.

Figure 9:
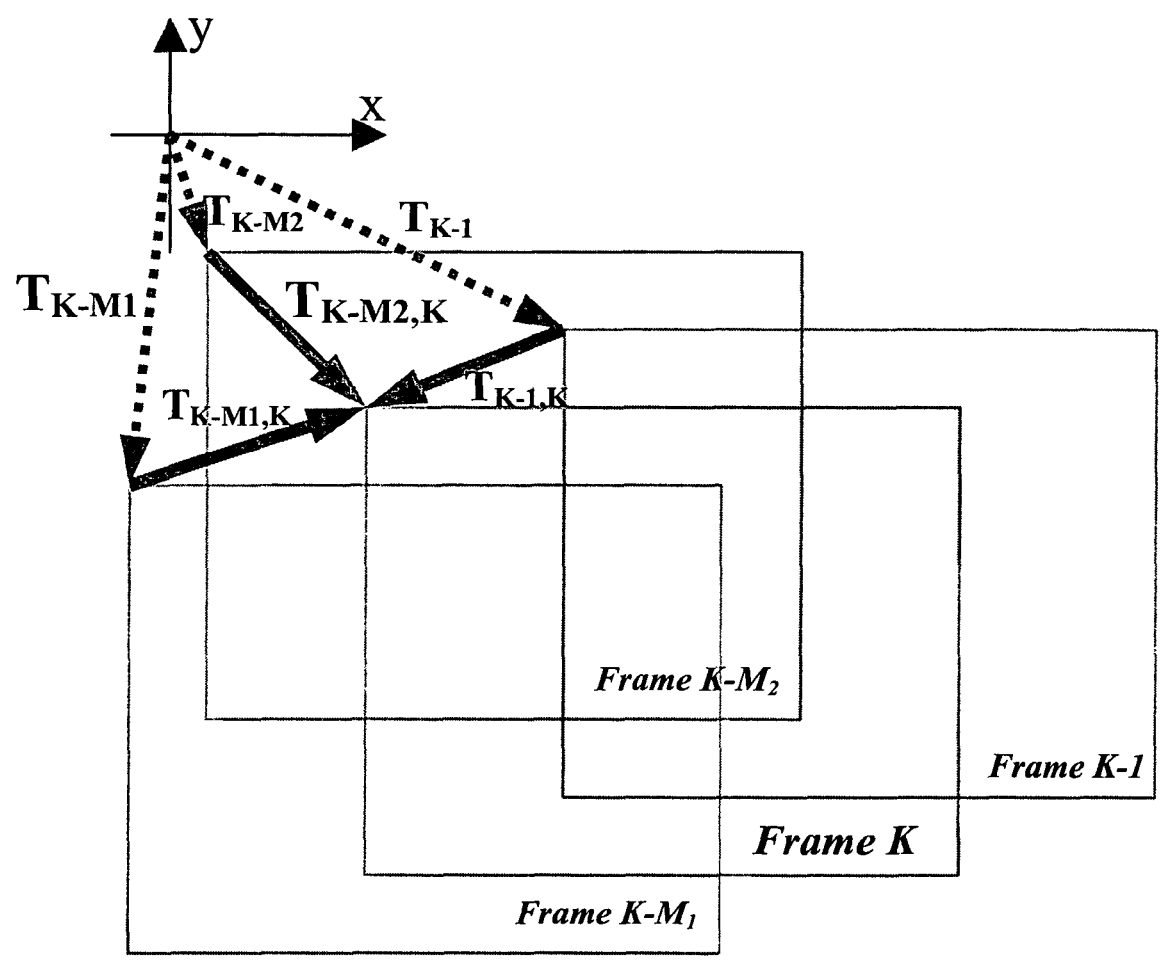
FIG. 9 shows robust motion integration approach.
Figure 10:
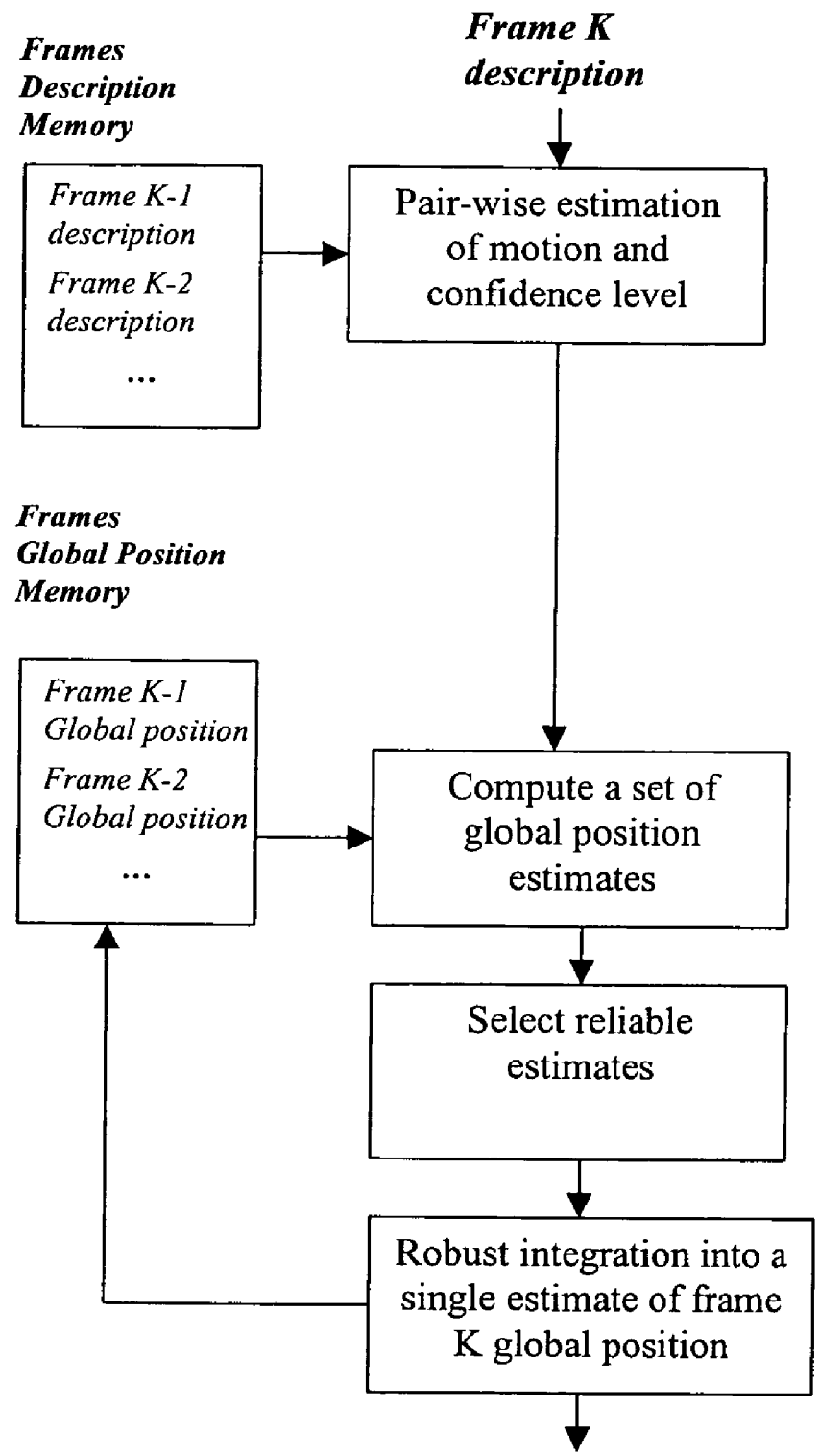
FIG. 10 shows a block diagram of the robust motion integration approach.

To remedy this problem, a novel method of robust integration of motion information using a multi-frame estimation is proposed. The concept of the proposed multi-frame robust integration method is shown in FIG. 9. The idea is to keep a compact descriptions extracted from a large number of past images/frames from the video sequence and derive motion estimates not only between consecutive frames, but also between many pairs of frames, which are not necessarily adjacent. These displacement estimates are then combined with the past history of frame positions and used to derive multiple estimates of the current frame position in a global coordinate system. Such component estimates are then combined via the robust integration method.

This extension is made possible by the fact that the invention provides a very compact representation (description) of an image and a computationally efficient method to estimate motion from such a description. It is therefore feasible to store such descriptors for many frames/images in the system memory. For example, to describe an image of N×M pixels with two lateral projections on X and Y the proposed method requires only $(X+Y)*2*4$ bytes.

A phase correlation method in its classical form requires the storage of FFT coefficients for the entire image, which results in $X*Y*2*4$ bytes. For example, for a VGA resolution video sequence (640×480 pixels), the memory required to store information about one frame for classical phase correlation method is sufficient to store information for 274 descriptors of frames.

Furthermore, with the most prior art algorithms it is not possible to match multiple frames in real time due to computationally expensive motion estimation. To illustrate this, we compare implementations of our algorithm disclosed here and an efficient prior art algorithm (Erturk), both running on Pentium-IV, 3 GHz processor and applied to video sequence with VGA resolution. In this case, motion estimation described in Eturk requires about 16 ms to analyse a pair of frames, which means it can be executed in real-time for real-time video with frame-rate of 30 frame per second. However, extension of Erturk with the robust integration of motion method disclosed here which uses only three-frames (i.e. matching frame K with frame K−1 combined with matching frame K with frame K−2), will require more than 30 ms per video frame and therefore cannot be executed in real-time. Motion estimation disclosed in this invention requires only 0.2 ms per pair of images and only about 5 KBytes of memory per frame. Thus robust integration of motion using M-frames will require 0.2(M−1) ms and 5M KBytes of memory storage. It can be easily seen that such extension can be realised on typical hardware and it will require a relatively small amount of memory even for large number of frames, e.g M=10, 50, 100.

Figure 11:
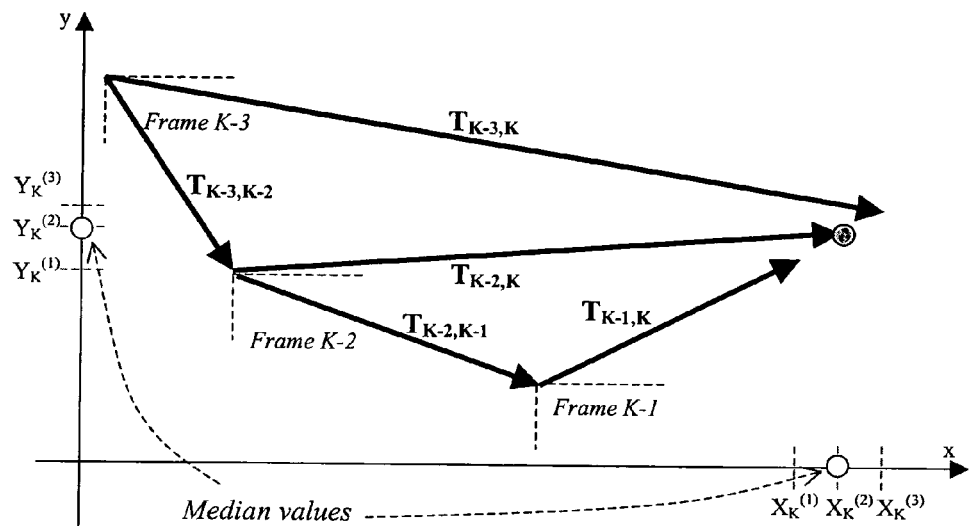
FIG. 11 depicts robust integration of motion estimation from three frames.

Robust integration of motion information is explained with reference to FIG. 11. It is assumed that the method uses M framed (including the current one) that all intermediate data $(D_i, T_i)$ is stored for the past M−1 frames. The following steps are performed for a new frame K.

1. Extract frame description $D_K$ for the frame K and store $D_K$ in a memory (keep only last N frame descriptions)

2. Create M−1 frame pairs (K−M+1, K), (K−M+2, K), ... (K−1,K). For each frame pair (K−i, K), i=1, 2, ..., M−1 compute estimates of motion $T_{K-i,K}$ between frames K−i and K using two frame descriptors $D_{K-i}, D_K$ that are stored in the memory. For each pair also compute estimate confidence factor $C_{K-i,K}$ based on the corresponding phase correlation coefficients. Link each estimate with its confidence measure $(T_{K-i,K}, C_{K-i,K})$ 3. Compute a set of M−1 estimates $\{T_K^{(1)}, \ldots, T_K^{(M-1)}\}$ of position of frame K in global coordinate system: $T_K^{(1)} = T_{K-1} + T_{K-1,K}$; $T_K^{(2)} = T_{K-2} + T_{K-2,K}$; ..., $T_K^{(M-1)} = T_{K-(M-1)} + T_{K-(M-1),K}$ 4. Integrate (combine) all M estimates of positions $T_K^{(1)}$, $T_K^{(2)}, \ldots, T_K^{(M-1)}$ into a single estimate $T_K$ using any prior-art robust method. For example, trimmed average and median filters were tested with good results. Exclude from the integration process estimates $T_K(i)$ for which the associated confidence factors $C_{K-i,K}$ are below a confidence threshold.

Figure 12:
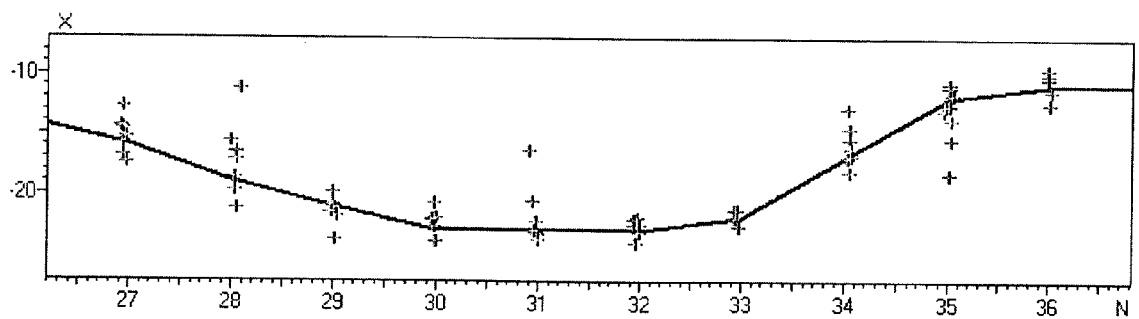
FIG. 12 depicts the results of the processing using robust integration of motion for several frames from the "Donostia" sequence (only x-component shown).

FIG. 12 shows results of the processing using robust integration of motion for several frames from the "Donostia" sequence. Green crosses show multiple measurements of $T_N$ and red curve connects their median values and represents the overall estimate.

Figure 13:
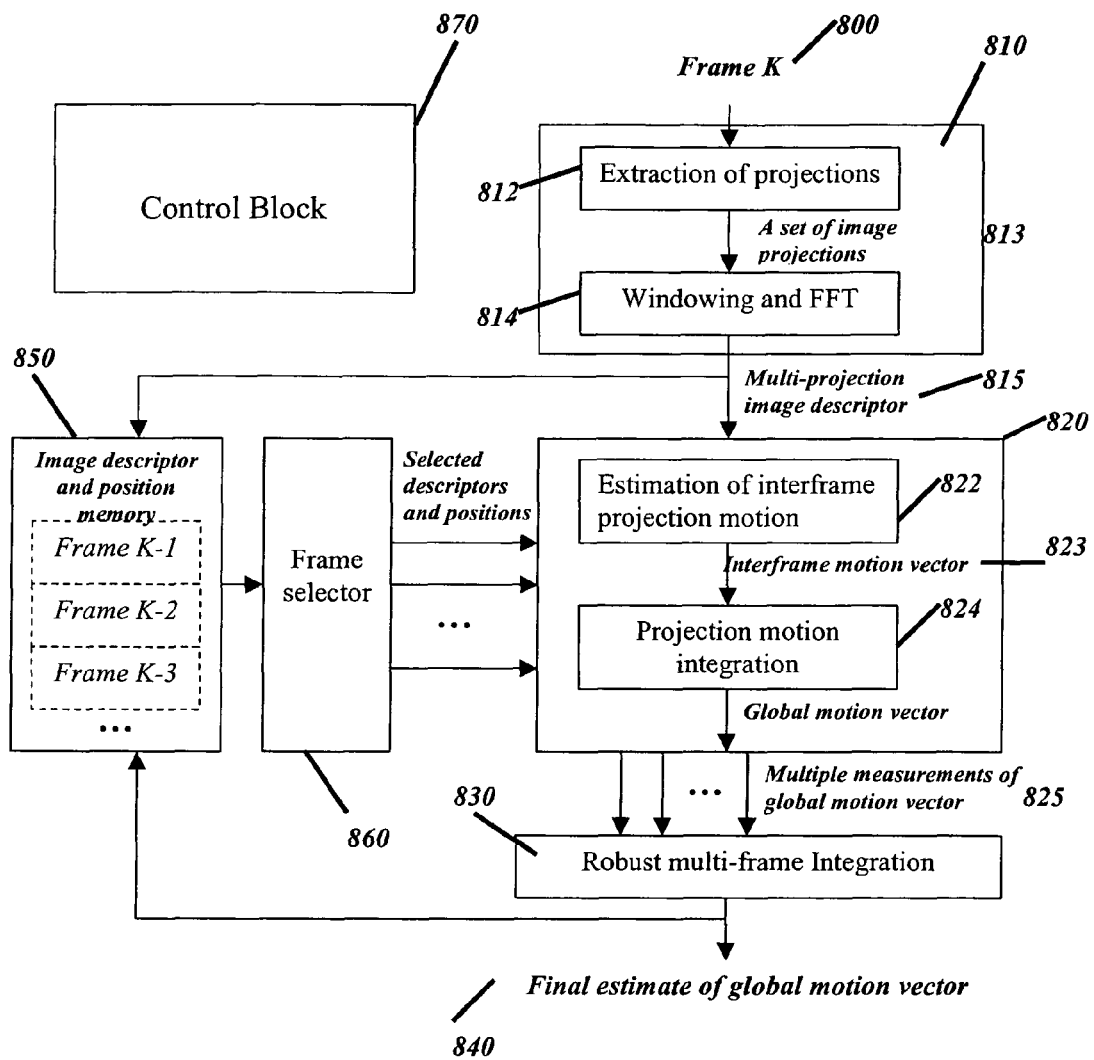
FIG. 13 is a block diagram of a video sequence motion analysis circuit based on the invention.

FIG. 13 shows a block-diagram of the video sequence motion analysis circuit based on the invention. A new video frame K (800) is input into system and projections of the frames are extracted in block 812. Each projection is then processed in the Windowing and FFT block 814 to form a multi-projection image descriptor 815. The descriptor is stored in the memory 850. The motion estimator 820 estimates motions between the current frame K and one of the previous frames K−i, depending on the setting of the frame selector 860. The estimation is based on the frame descriptors. The motion estimator consists of estimator of component projection motion (822) and projection motion integrator (824), which computes overall motion between selected frames K, K−i from the component projection motions. Module 824 also computes global position of the frame K in the global coordinate system. Multiple measurements are combined in the Robust multi-frame integration block 830 to obtain the final estimate of global motion vector 840. The estimation process is controlled by the control block 870.

Performance

Table 1 shows comparison of the time required for global motion estimation between two video frames of 640×480 resolution. The processing was performed on a on Pentium IV, 3 GHz processor.

TABLE 1

| Algorithm | Execution time [mS] |
| --- | --- |
| Proposed Algorithm | 1.6 mS |
| Phase Correlation | 960 mS |
| Phase Correlation with image sub-sampling by four | 54.0 mS |
| Phase Correlation restricted to four corner regions (Erturk) | 16 mS |

As discussed above, a windowing is applied to the 1-dimensional projections to produce a 1-dimensional representation, and a Fourier transform is applied to the 1-dimensional representation. Preferably, a Hann window is used. Preferably, the window is constant. For example, when using the representation for image comparison or registration, preferably the same, constant, window is used for comparing different pairs of images, when processing a sequence of images.

In this specification, the terms "image" and "frame" are used to describe an image unit, including after filtering, but the term also applies to other similar terminology such as image, field, picture, or sub-units or regions of an image, frame etc. The terms pixels and blocks or groups of pixels may be used interchangeably where appropriate. In the specification, the term image means a whole image or a region of an image, except where apparent from the context. Similarly, a region of an image can mean the whole image. An image includes a frame or a field, and relates to a still image or an image in a sequence of images such as a film or video, or in a related group of images.

The image may be a grayscale or colour image, or another type of multi-spectral image, for example, IR, UV or other electromagnetic image, or an acoustic image etc.

The invention can be implemented for example using an apparatus processing signals corresponding to images. The apparatus could be, for example, a computer system, with suitable software and/or hardware modifications. For example, the invention can be implemented using a computer or similar having control or processing means such as a processor or control device, data storage means, including image storage means, such as memory, magnetic storage, CD, DVD etc, data output means such as a display or monitor or printer, data input means such as a keyboard, and image input means such as a scanner, or any combination of such components together with additional components. Aspects of the invention can be provided in software and/or hardware form, or in an application-specific apparatus or application-specific modules can be provided, such as chips. Components of a system in an apparatus according to an embodiment of the invention may be provided remotely from other components, for example, over the internet.

The invention claimed is:

1. A method of representing a 2-dimensional image I(x, y) comprising:

deriving at least two 1-dimensional representation of the image by projecting the image onto at least perpendicular X and Y axes aligned with the edges of the images, wherein projection onto an axis A involves, for each position a on axis A, summing image values for pixels along a line perpendicular to axis A at position a, and wherein projection onto X and Y axes is computed as $$XProjection(x) = \sum_y I(x, y),$$
$$YProjection(y) = \sum_x I(x, y)$$

applying a windowing operator to said at least two 1-dimensional representations to reduce artifacts caused by signal boundaries, using a predetermined window function with constant parameters and a size dependent only on a length of a 1-dimensional representation; and applying a Fourier transform to each windowed 1-dimensional representation.

2. The method of claim 1, wherein at least one axis is parallel to the edge of the image.

3. The method of claim 1, applied to at least one colour component.

4. The method of claim 3 applied to at least a green colour component.

5. The method of claim 1, applied to intensity values.

6. Use of the representation of claim 1.

7. Use as claimed in claim 6 for camera stabilisation.

8. Use as claimed in claim 6 comprising storage, transmission or reception of the representation.

9. The method of claim 1, comprising using a Hann window.

10. The method of claim 1 comprising deriving at least two 1-dimensional representations by projecting the image onto at least two respective axes.

11. The method of claim 1, wherein the predetermined window function is defined by:

$$W(x)=0.5(1+\cos(2\pi*(x/M-0.5))),$$

where M is the length of the 1-dimensional representation, and wherein the windowing operator is applied by $$P_1(x)=W(x)P(x),$$

where P(x) is the a 1-dimensional representation and $P_1(x)$ is a windowed 1-dimensional representation.

12. A method of comparing images comprising:

comparing corresponding 1-dimensional representations for each image in a representation derived by:

projecting the image onto at least perpendicular X and Y axes aligned with the edges of the images, wherein projection onto an axis A involves, for each position a on axis A, summing image values for pixels along a line perpendicular to axis A at position a, and wherein projection onto X and Y axes is computed as $$XProjection(x) = \sum_y I(x, y), \quad YProjection(y) = \sum_x I(x, y);$$

applying a windowing operator to said at least two 1-dimensional representations to reduce artifacts caused by signal boundaries; using a predetermined window function with constant parameters and a size dependent only on a length of a 1-dimensional representation; and applying a Fourier transform to each windowed 1-dimensional representation.

13. The method of claim 12 wherein comparing 1-dimensional representations involves aligning to determine the shift between the 1-dimensional representations.

14. The method of claim 13 wherein determining the shift between the 1-dimensional representations involves phase correlation.

15. The method of claim 14 wherein phase correlation involves an inverse Fourier transform and detection of a peak corresponding to a shift value.

16. The method of claim 12 for estimating motion between images.

17. The method of claim 16 comprising comparing at least one image with each of a plurality of other images, to derive a plurality of motion estimates including between non-consecutive images.

18. The method of claim 17 comprising determining a confidence measure for each motion estimate.

19. A method of determining the location of an image with reference to at least one reference image comprising summing shifts between images derived using the method of claim 17, comprising determining a plurality of image locations using a plurality of motion estimates and combining said motion estimates.

20. The method of claim 19 comprising excluding motion estimates with confidence measures below a threshold.

21. The method of claim 19, wherein said motion estimates are combined using averaging.

22. A method of deriving a representation of motion in a sequence of images comprising estimating motion between images using the method of claim 16.

23. A representation of motion in a sequence of images derived using the method of claim 22.

24. Use of the representation of claim 23.

25. Use as claimed in claim 24 comprising storage, transmission or reception of the representation.

26. A method of determining the location of an image with reference to at least one reference image comprising summing shifts between images derived using the method of claim 12.

27. A method of processing a sequence of images using the method of claim 12, wherein windowing is applied to the 1-dimension projections, and wherein the same window is used for different pairs of images.

28. An apparatus for representing a 2-dimensional image I(x, y), the apparatus comprising:
a memory; and a control device that performs the steps of deriving at least two 1-dimensional representations of the image by projecting the image onto at least perpendicular X and Y axes aligned with the edges of the images, wherein projection onto an axis A involves, for each position a on axis A, summing image values for pixels along a line perpendicular to axis A at position a, and wherein projection onto X and Y axes is computed as $$XProjection(x) = \sum_y I(x, y), \quad YProjection(y) = \sum_x I(x, y);$$

applying a windowing operator to said at least two 1-dimensional representations to reduce artifacts caused by signal boundaries, using a predetermined window function with constant parameters and a size dependent only on a length of a 1-dimensional representation; and
applying a Fourier transform to said windowed 1-dimensional representation.

29. An apparatus for executing a method of representing a 2-dimensional image I(x, y) comprising:
a deriving unit to derive at least two 1-dimensional representation of the image by projecting the image onto at least perpendicular X and Y axes aligned with the edges of the images, wherein projection onto an axis A involves, for each position a on axis A, summing image values for pixels along a line perpendicular to axis A at position a, and wherein projection onto X and Y axes is computed as $$XProjection(x) = \sum_y I(x, y), \quad YProjection(y) = \sum_x I(x, y);$$

a windowing unit to apply a windowing operator to said at least two 1-dimensional representations to reduce artifacts caused by signal boundaries, using a predetermined window function with constant parameters and a size dependant only on a length of a 1-dimensional representation; and a Fourier Transform unit to apply a Fourier transform to each windowed 1-dimensional representation.

30. A computer-readable storage medium storing computer executable instructions capable of being executed by a computer to perform a method of representing a 2-dimensional image I(x, y) comprising:
deriving at least two 1-dimensional representation of the image by projecting the image onto at least perpendicular X and Y axes aligned with the edges of the images, wherein projection onto an axis A involves, for each position a on axis A, summing image values for pixels along a line perpendicular to axis A at position a, and wherein projection onto X and Y axes is computed as $$XProjection(x) = \sum_y I(x, y), \quad YProjection(y) = \sum_x I(x, y);$$

applying a windowing operator to said at least two 1-dimensional representation to reduce artifacts caused by signal boundaries, using a predetermined window function with constant parameters and a size dependent only on a length of a 1-dimensional representation; and
applying a Fourier transform to each windowed 1-dimensional representation.

* * * * *